US007016911B2

(12) United States Patent
Bousfield et al.

(10) Patent No.: US 7,016,911 B2
(45) Date of Patent: Mar. 21, 2006

(54) MANAGEMENT OF USER-DEFINED ROUTINE LIBRARIES IN DATABASE ENVIRONMENTS

(75) Inventors: Melissa N. Bousfield, Vancouver (CA); Douglas J. Doole, Don Mills (CA); Sean W. McKeough, Markham (CA); Timothy J. Vincent, Toronto (CA); George M. Wilson, Sunnyvale, CA (US)

(73) Assignee: International Business Machines Corporation, Armonk, NY (US)

( * ) Notice: Subject to any disclaimer, the term of this patent is extended or adjusted under 35 U.S.C. 154(b) by 365 days.

(21) Appl. No.: 10/317,276

(22) Filed: Dec. 10, 2002

(65) Prior Publication Data

US 2003/0120635 A1    Jun. 26, 2003

(30) Foreign Application Priority Data

Dec. 21, 2001    (CA) .................................... 2366338

(51) Int. Cl.
    *G06F 17/30*    (2006.01)
(52) U.S. Cl. .................................... 707/101; 707/104.1
(58) Field of Classification Search ............ 707/104.1, 707/101, 6, 205, 8
    See application file for complete search history.

(56) References Cited

U.S. PATENT DOCUMENTS

| 5,410,698 | A | * | 4/1995 | Danneels et al. ........... 719/331 |
| 5,561,800 | A |   | 10/1996 | Sabatella ..................... 395/700 |
| 5,768,589 | A |   | 6/1998 | Bradley et al. ............. 395/684 |
| 5,918,225 | A | * | 6/1999 | White et al. .................... 707/3 |
| 6,003,095 | A |   | 12/1999 | Pekowski et al. ........... 709/305 |
| 6,035,307 | A |   | 3/2000 | Martin et al. ............... 707/203 |
| 6,052,778 | A |   | 4/2000 | Hagy et al. .................... 713/2 |
| 6,067,577 | A |   | 5/2000 | Beard ......................... 709/305 |
| 6,308,184 | B1 | * | 10/2001 | Hewitt ....................... 707/205 |
| 6,424,975 | B1 | * | 7/2002 | Walter et al. ............... 707/200 |
| 6,574,643 | B1 | * | 6/2003 | Walter et al. ............... 707/205 |
| 6,681,216 | B1 | * | 1/2004 | Hewitt ........................... 707/1 |

FOREIGN PATENT DOCUMENTS

JP    1023123 A    1/1989

OTHER PUBLICATIONS

"Management of Multiple Shared Library Segments", Technical Disclosure Bulletin, vol. 32, No. 5A, pp. 242-243, Oct. 1989.

* cited by examiner

*Primary Examiner*—Jean M. Corrielus
(74) *Attorney, Agent, or Firm*—John L. Rogitz

(57) ABSTRACT

Library management for libraries of user-defined routines in a database system. Libraries are stored in a long-term storage device and loaded into working memory in the database system when routines in the libraries are to be executed. An unload thread is defined to carry out the process of unloading libraries from the working memory when such libraries are inactive. The unload thread becomes active on a defined timing interval. The unload thread accesses a hash table and a most recently used list to determine which of the loaded libraries is inactive and which of the libraries ought to be unloaded. The hash table maintains information as to which libraries have been accessed in the most recent past defined timing interval. The size of the most recently used list can be defined such that all libraries associated with the list are retained in working memory.

21 Claims, 1 Drawing Sheet

MANAGEMENT OF USER-DEFINED ROUTINE LIBRARIES IN DATABASE ENVIRONMENTS

FIELD OF THE INVENTION

This invention generally relates to computing systems and in particular to the management of user-defined routine libraries in database management environments.

BACKGROUND OF THE INVENTION

It is desirable for database management systems (DBMSs) to support user-defined routines such as stored procedures and user-defined functions. Such user-defined routines are typically stored in libraries. A library is used by a database system when one of the routines contained in the library is invoked by an application accessing the database system. When this occurs, a library containing the stored user-defined routine is loaded from a long-term memory location to a working memory location from which the routine may be executed. Where the DBMS has a heavy workload that requires repeatedly invoking numerous routines located in numerous different libraries, the overhead in loading and unloading user-defined routine libraries can have a significant impact on the performance of the database system.

A DBMS may use a library-management strategy that keeps in the working memory all once-loaded user-defined routine libraries. This approach will avoid the overhead of repeatedly loading and unloading user-defined routine libraries but will require working memory to be dedicated to user-defined routine libraries that have been previously used but may no longer be actively used by the application. Another alternative solution is to impose a fixed limit on the number of user-defined routines that can be loaded into working memory at any one time. Typically, such a list is ordered from most recently used to least recently used. If the DBMS seeks to load a library after the maximum number of libraries is reached, the least recently used library is unloaded. This approach becomes less efficient, however, where there are many user-defined routine libraries that are consistently used by the DBMS. In this case, the number of libraries used may exceed the system limit and as a result libraries will frequently be loaded and unloaded. A system overhead associated with loading and unloading libraries may therefore potentially occur in such a system. In addition, such systems will require a system administrator to spend time to monitor and tune the configured size list.

It is therefore desirable to provide a database management system that supports user-defined routine libraries and which dynamically retains actively used libraries in memory while providing that user-defined routine libraries that are not actively used are unloaded.

SUMMARY OF THE INVENTION

According to an aspect of the present invention there is provided a system and method for the management of user-defined routine libraries in a database management system.

According to another aspect of the present invention there is provided a computer program product for a computer programming environment including a database system, the database system including a memory device for storing user-defined routine libraries and a working memory for storing working copies of user-defined routine libraries, the computer program product including a computer usable medium having computer readable code means embodied in said medium for managing libraries of user-defined routines in the database system, including computer readable program code means for defining and launching an unload thread for unloading inactive libraries from the working memory, and computer readable program code means for defining and maintaining an identifying data structure for specifying locations in the working memory, the identifying data structure including entries, each entry specifying an associated loaded library stored in the working memory and having an associated last loaded value, the unload thread including computer readable program code means for periodically accessing the identifying data structure to identify unload candidate libraries on an unload timing interval, each unload candidate library having an associated entry in the identifying data structure in which the last loaded value indicates that the unload candidate library has been inactive over the preceding unload timing interval, and computer readable program code means for removing libraries from the working memory where such libraries are identified as being unload candidate libraries.

According to another aspect of the present invention there is provided the above computer program product, further including computer readable program code means for defining and maintaining a timing counter, computer readable program code means for incrementing the timing counter on a periodic basis related to the unload timing interval, and computer readable program code means for defining the last loaded values in entries in the identifying data structure based on the value of the timing counter, and in which the computer readable program code means for periodically accessing the identifying data structure to identify unload candidate libraries includes means for comparing the last loaded values for entries in the identifying data structure with the timing counter.

According to another aspect of the present invention there is provided the above computer program product, further including computer readable program code means for defining and maintaining a most recently used list data structure, the most recently used list including list items, each list item specifying a corresponding entry in the identifying data structure, the list items in the most recently used list being ordered to reflect the order in which libraries associated with identifying data structure entries have been accessed to commence execution of user-defined routines.

According to another aspect of the present invention there is provided the above computer program product in which the computer readable program code means for defining and maintaining a most recently used list data structure further includes means for configuring a defined maximum number of list items in the most recently used list and means for removing items from the most recently used list where a maximum number of list items has been exceeded.

According to another aspect of the present invention there is provided the above computer program product in which the computer readable program code means for removing unload candidate libraries includes means for removing all unload candidate libraries other than unload candidate libraries having corresponding list items on the most recently used list.

According to another aspect of the present invention there is provided the above computer program product, further including computer readable program code means for accessing the most recently used list to indicate to the database system which libraries have been most recently accessed whereby the database system may select libraries to be unloaded from the working memory, in which the identifying data structure includes a hash table, and, further including computer readable program code means for tuning the unload timing interval for improving efficiency of unloading libraries.

According to another aspect of the present invention there is provided a method for managing user-defined routine libraries in a database system, the database system including a memory device for storing user-defined routine libraries and a working memory for storing working copies of user-defined routine libraries, the database system responding to requests to execute user-defined routines stored in the user-defined routine libraries, the method including the following steps defining and maintaining a timing counter, defining and maintaining an identifying data structure for specifying locations in the working memory, the identifying data structure including entries, each entry specifying an associated loaded library stored in the working memory and having an associated last loaded value, defining and maintaining a most recently used list data structure, the most recently used list including list items, each list item specifying a corresponding entry in the identifying data structure, the list items in the most recently used list being ordered to reflect the order in which libraries associated with identifying data structure entries have been accessed to commence execution of user-defined routines responding to each request to execute a specified user-defined routine in an identified user-defined routine library by carrying out the following steps, when the identified user-defined routine library is not loaded in the working memory at the time of the request, generating a new entry in the identifying data structure for the user-defined routine library and defining the last loaded value for the new entry to be the value of the timing counter, when the identified user-defined routine library is loaded in the working memory at the time of the request, updating the last loaded value for the associated entry in the identifying data structure entry to be the value of the timing counter, and updating the most recently used list such that the first list item in the most recently used list corresponds to the entry in the identifying data structure associated with the identified library, defining an unload thread to become active on a predefined unload timing interval, the unload thread periodically accessing the identifying data structure to identify unload candidate libraries on an unload timing interval, each unload candidate library having an associated entry in the identifying data structure, comparing the last loaded values for entries in the identifying data structure with the timing counter to determine that the unload candidate library has been inactive over the preceding unload timing interval, incrementing the timing counter on a periodic basis related to the unload timing interval, and removing libraries from the working memory where such libraries are identified as being unload candidate libraries and where such libraries do not have corresponding list items on the most recently used list.

According to another aspect of the present invention there is provided a computer program product for a computer programming data processing environment, the computer program product including a computer usable medium having computer readable code means embodied in said medium for library management, including computer readable program code means for carrying out the above method.

Advantages of the invention include a system that permits actively used user-defined routine libraries to be maintained in memory while removing libraries that are inactive. The system of the invention is able to be self-adjusting to permit the loaded libraries to match a given system workload.

BRIEF DESCRIPTION OF THE DRAWING

In the accompanying drawing which illustrates the invention by way of example only.

Figure 1:
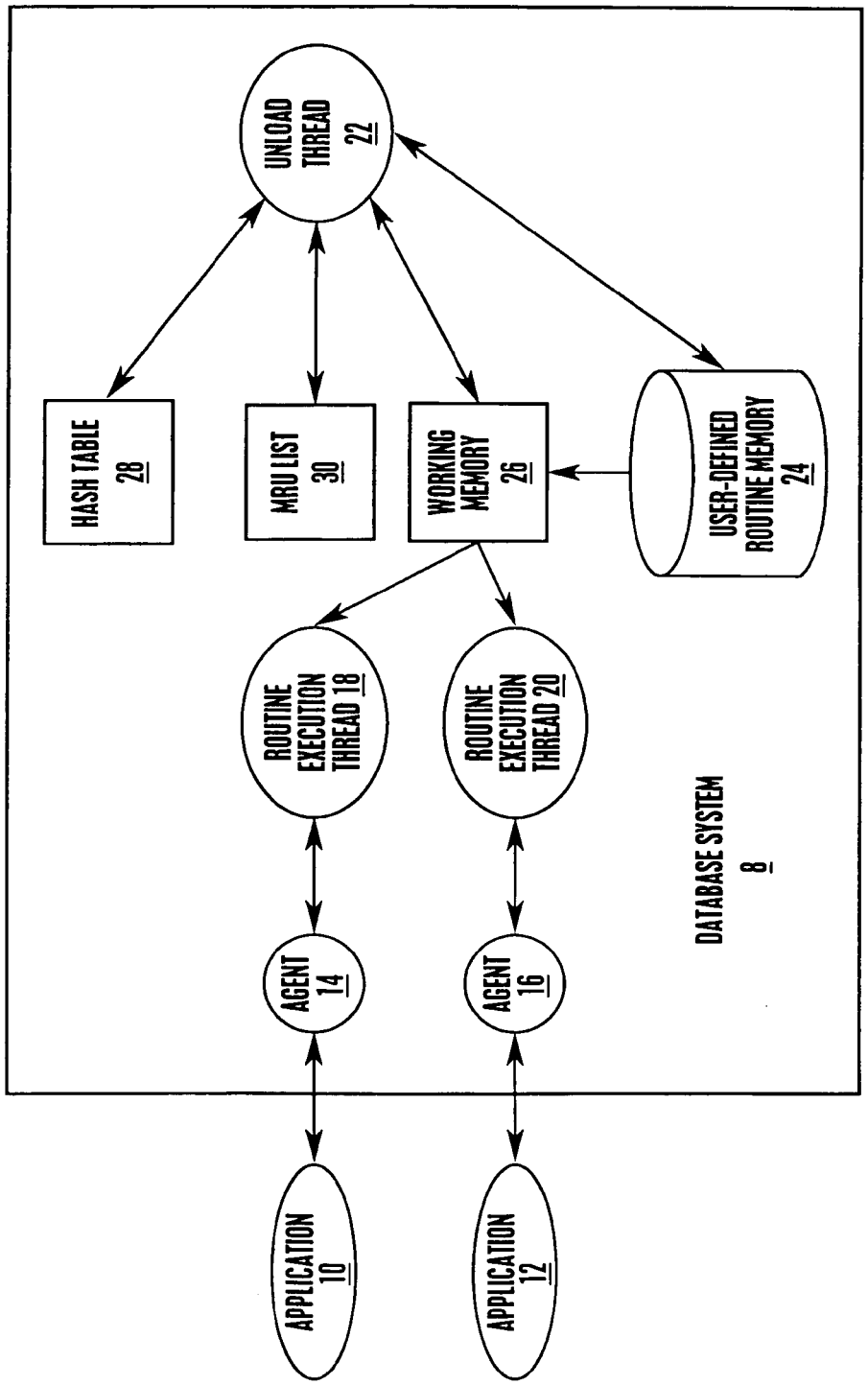
FIG. 1 is a block diagram showing an example of user-defined routine management in accordance with the preferred embodiment.

In the drawing, the preferred embodiment of the invention is illustrated by way of example. It is to be expressly understood that the description and drawings are only for the purpose of illustration and as an aid to understanding, and are not intended as a definition of the limits of the invention.

DETAILED DESCRIPTION OF THE INVENTION

FIG. 1 is a block diagram illustrating the user-defined routine library management of the preferred embodiment using an example showing database system 8 with application processes 10, 12. Application processes 10, 12 access database system 8 using agent processes 14, 16, respectively. FIG. 1 illustrates an example where agent invocation of user-defined routines causes routine execution threads 18, 20 to be used to execute the invoked routines. In FIG. 1, threads 18, 20 are shown within database system 8.

As will be appreciated by those skilled in the art, database system 8 may launch processes that run independently from the database engine of database system 8 and that will create threads (such as threads 18, 20) for the execution of user-defined routines. This will lessen or eliminate the risk that a user-defined routine will interfere with the operation of, or damage, the database engine. Similarly, FIG. 1 shows unload thread 22, used to unload user-defined routine libraries. This thread is not associated directly with an agent in the database engine. FIG. 1 shows all three threads 18, 20, 22 as being within database system 8. Conceptually, the execution of routines and operation of the unload function may be considered part of the database function, even where the processing occurs in a process distinct from the database engine itself.

In the example of FIG. 1, libraries of user-defined routine code are located in the memory device shown as user-defined routine memory 24. This may be a disk or other long-term magnetic storage medium in which reference copies of routine libraries are stored. When a user-defined routine is to be executed by a thread in the user-defined routine process (either of threads 18, 20 in the example of FIG. 1), the user-defined routine library containing the user-defined routine is copied (loaded) to working memory 26.

In the preferred embodiment, the user-defined routine libraries that are loaded in working memory 26 at a given time are recorded by entries in hash table 28. A record or entry in hash table 28 contains the name of a user-defined routine library and a last loaded value, as described in more detail below. In addition, a most recently used (MRU) list 30 is maintained by the system of the preferred embodiment. MRU list 30 is effectively an index into hash table 28. MRU list 30 is a configurably-sized list, ordered by time of access of the user-defined routine libraries. Time of access for a library is the most recent time at which execution of a routine in the library was commenced. The size of MRU list 30 has a significance described below.

The system of the preferred embodiment maintains an unload timing interval value that is tuneable for different systems and applications, to give efficient performance. The unload timing interval is used to define a wake up period for unload thread 22, in the thread becomes active on the expiry of the unload timing interval. The system further includes a timing counter that is incremented immediately before unload thread 22 becomes inactive.

In operation, applications 10 and 12 send requests to database system 8. In the example of FIG. 1, these requests are shown as being handled by respective agents 14, 16. Where a request results in the invocation of a user-defined routine, one of agents 14, 16 will either use an existing thread or will cause a new thread to be launched, for the execution of the user-defined routine (in the example of FIG. 1 these threads are shown as routine execution threads 18, 20).

When one of threads 18, 20 is selected for execution of a user-defined routine that is in an unloaded library, the routine's library in user-defined routine memory 24 is loaded into working memory 26. In this case, a new hash table entry with the name of the user-defined routine library is created in hash table 28. The last loaded value in the new hash table entry is set to be the current value of the timing counter value. When a user-defined routine library is loaded, an entry is also inserted at the head of MRU list 30. MRU list 30 has a defined length. Where the addition of the loaded library to MRU list 30 causes the list to overflow, the oldest entry in the list is removed from the list (i.e. the last entry on the list is removed).

If the routine being accessed by one of threads 18, 20 is in a library that is already loaded in working memory 26, there will already be a corresponding entry in hash table 28. As will be appreciated from this description, the library containing the routine may have been loaded in working memory 26 as the result of a previous invocation of that routine or of another routine in the same library. The earlier invocation may have originated from the same application as the later invocation, or from a different one. This feature of the preferred embodiment provides further efficiency by avoiding the reloading of a library where the library is already found in working memory 26.

Thus, when the library sought is the loaded library found in the hash table, a load step is avoided. The last loaded value in the corresponding hash table 28 entry is updated to be equal to the current timing counter value. MRU list 30 is also updated to reflect this access of the loaded library. The library's entry in MRU list 30 will be moved to the head of the list.

In the preferred embodiment, libraries are unloaded from working memory 26 in two different ways. The first of these is by operation of unload thread 22. This thread is defined to become active on a cycle defined by the unload timing interval. When active, unload thread 22 traverses all buckets in hash table 28. By reading the last loaded values in the records in hash table 28 and comparing these to the current unload interval value, unload thread 22 is able to define certain libraries to be candidates for unloading from working memory 26.

This determination is based on whether a given library remains active in the database system. The current value for the timing counter is compared with the last loaded value in each entry in hash table 28. Where the last loaded value is not equal to the current value of the timing counter, the user-defined routine has been inactive in the most recent unload timing interval and is therefore a candidate to be unloaded from working memory 26. The combination of the last loaded value associated with loaded libraries, and the periodic inspection of this value, permits the system of the preferred embodiment to efficiently manage the loading and unloading of user-defined routine libraries.

As indicated above with respect to the selection of the unload timing interval, system design and usage will dictate the details of the approach used for unloading user-defined routine libraries. For example, in the preferred embodiment, the DBMS includes a defined value representing a minimum number of user-defined routines that are to remain loaded in working memory 26. This minimum will prevent unnecessary unloading of user-defined routines where the system as a whole is inactive or where there is a particularly concentrated use of a small number of user-defined routines. In such cases, there may be a number of user-defined routines which are inactive but which do not have to be unloaded to provide system efficiency. Removal of a library from working memory 26 is a two-step process. First, unload thread 22 will determine the set of user-defined routine libraries that are candidates to be unloaded by interrogating the last loaded values in hash table 28 entries. Unload thread 22 will then ensure that the minimum number of user-defined routine libraries stay loaded in working memory 26. In the preferred embodiment this is accomplished by selecting the size of MRU list 30 to be the minimum number of libraries to stay loaded. When unload thread 22 traverses hash table 28, it also compares unload candidate libraries with MRU list 30. If an unload candidate library is on MRU list 30, unload thread 22 will not remove the library from working memory 26. In this way, libraries in MRU list 30 will not be unloaded, even if the interval value for the library in the hash table is less than the current interval.

As will be appreciated, when a library is unloaded from working memory 26, the corresponding entries are removed from hash table 28 and MRU list 30.

Once unload thread 22 has carried out the unloading of the loaded but inactive user-defined routines, as described above, the timing counter is incremented and unload thread 22 becomes inactive. As set out above, unload thread 22 becomes active again at the expiry of the unload timing interval.

The second way in which routines are unloaded from working memory 26 in the preferred embodiment is related to the size limit on memory. In the preferred embodiment, working memory 26 includes a limit on the aggregate size of user-defined routines that may be loaded at any one time. Therefore, a check is carried out when database system 8 seeks to load a user-defined routine library into working memory 26. If the loading of the user-defined routine library will exceed the maximum size limit, the appropriate libraries are then unloaded to permit the loading of the required library. This step uses the same logic as is followed by unload thread 22 described above. However, the step is carried out at the time of routine invocation, rather than periodically on the unload timing interval. In addition, even if a library is on MRU list 30, it will be unloaded to make room for the library to be newly loaded. MRU list 30 can be used to determine in which order libraries should be unloaded from working memory 26.

The use of an appropriately selected unload timing interval and the operation of unload thread 22 will reduce, or eliminate, the number of times that threads 18, 20 will be required to unload libraries before loading new libraries. The use of MRU list 30 permits relatively inactive user-defined routine libraries to be unloaded when it is necessary for a new library to be loaded that will exceed the maximum available memory in working memory 26.

Although a preferred embodiment of the invention has been described above, it will be appreciated by those skilled in the art that variations may be made. For example, MRU list 30 may be replaced by another data structure that reflects the access order of the user-define routine libraries. Such variations may be made without departing from the spirit of the invention or the scope of the appended claims.

The embodiments of the invention in which an exclusive right or privilege is claimed are described as follows:

1. A computer program product for a computer programming environment comprising a database system, the database system comprising a memory device for storing user-defined routine libraries and a working memory for storing working copies of user-defined routine libraries, the computer program product comprising a computer usable medium having computer readable code means embodied in said medium for managing libraries of user-defined routines in the database system, comprising:
   computer readable program code means for defining and launching an unload thread for unloading inactive libraries from the working memory, and computer readable program code means for defining and maintaining an identifying data structure for specifying locations in the working memory, the identifying data structure comprising entries, each entry specifying an associated loaded library stored in the working memory and having an associated last loaded value, the unload thread comprising
   computer readable program code means for periodically accessing the identifying data structure to identify unload candidate libraries on an unload timing interval, each unload candidate library having an associated entry in the identifying data structure in which the last loaded value indicates that the unload candidate library has been inactive over the preceding unload timing interval;
   computer readable program code means for defining and maintaining a timing counter,
   computer readable program code means for incrementing the timing counter on a periodic basis related to the unload timing interval, and
   computer readable program code means for defining the last loaded values in entries in the identifying data structure based on the value of the timing counter, and in which the computer readable program code means for periodically accessing the identifying data structure to identify unload candidate libraries comprises means for comparing the last loaded values for entries in the identifying data structure with the timing counter.

2. The computer program product of claim 1, further comprising:
   computer readable program code means for removing libraries from the working memory where such libraries are identified as being unload candidate libraries.

3. The computer program product of claim 1, further comprising computer readable program code means for accessing the most recently used list to indicate to the database system which libraries have been most recently accessed whereby the database system may select libraries to be unloaded from the working memory.

4. The computer program product of claim 1, in which the identifying data structure comprises a hash table.

5. The computer program product of claim 1, further comprising computer readable program code means for tuning the unload timing interval for improving efficiency of unloading libraries.

6. The computer program product of claim 1, wherein the database system is an SQL system.

7. A computer program product for a computer programming environment comprising a database system, the database system comprising a memory device for storing user-defined routine libraries and a working memory for storing working copies of user-defined routine libraries, the computer program product comprising a computer usable medium having computer readable code means embodied in said medium for managing libraries of user-defined routines in the database system, comprising:
   computer readable program code means for defining and launching an unload thread for unloading inactive libraries from the working memory, and computer readable program code means for defining and maintaining an identifying data structure for specifying locations in the working memory, the identifying data structure comprising entries, each entry specifying an associated loaded library stored in the working memory and having an associated last loaded value, the unload thread comprising
   computer readable program code means for periodically accessing the identifying data structure to identify unload candidate libraries on an unload timing interval, each unload candidate library having an associated entry in the identifying data structure in which the last loaded value indicates that the unload candidate library has been inactive over the preceding unload timing interval;
   computer readable program code means for defining and maintaining a most recently used list data structure, the most recently used list comprising list items, each list item specifying a corresponding entry in the identifying data structure, the list items in the most recently used list being ordered to reflect the order in which libraries associated with identifying data structure entries have been accessed to commence execution of user-defined routines.

8. The computer program product of claim 7 wherein the computer readable program code means for defining and maintaining a most recently used list data structure further comprises means for configuring a defined maximum number of list items in the most recently used list and means for removing items from the most recently used list where a maximum number of list items has been exceeded.

9. The computer program product of claim 8 wherein the computer readable program code means for removing unload candidate libraries comprises means for removing all unload candidate libraries other than unload candidate libraries having corresponding list items on the most recently used list.

10. A sub-system for managing libraries of user-defined routines in a database system, the database system comprising a memory device for storing user-defined routine libraries and a working memory for storing working copies of user-defined routine libraries, the sub-system comprising:
   means for defining and launching an unload thread for unloading inactive libraries from the working memory, and means for defining and maintaining an identifying data structure for specifying locations in the working memory, the identifying data structure comprising entries, each entry specifying an associated loaded library stored in the working memory and having an associated last loaded value, the unload thread comprising
   means for periodically accessing the identifying data structure to identify unload candidate libraries on an unload timing interval, each unload candidate library having an associated entry in the identifying data structure in which the last loaded value indicates that the unload candidate library has been inactive over the preceding unload timing interval, means for defining and maintaining a most recently used list data structure, the most recently used list comprising list items, each list item specifying a corresponding entry in the identifying data structure, the list items in the most recently used list being ordered to reflect the order in which libraries associated with identifying data structure entries have been accessed to commence execution of user-defined routines.

11. The sub-system of claim 10, further comprising means for removing libraries from the working memory where such libraries are identified as being unload candidate libraries.

12. The sub-system of claim 10 in which the means for defining and maintaining a most recently used list data structure further comprises means for configuring a defined maximum number of list items in the most recently used list and means for removing items from the most recently used list where a maximum number of list items has been exceeded.

13. The sub-system of claim 12 in which the means for removing unload candidate libraries comprises means for removing all unload candidate libraries other than unload candidate libraries having corresponding list items on the most recently used list.

14. The sub-system of claim 10, further comprising means for accessing the most recently used list to indicate to the database system which libraries have been most recently accessed whereby the database system may select libraries to be unloaded from the working memory.

15. The sub-system of claim 10, in which the identifying data structure comprises a hash table.

16. The sub-system of claim 10, further comprising means for tuning the unload timing interval for improving efficiency of the sub-system.

17. The sub-system of claim 10, wherein the database system is an SQL system.

18. A sub-system for managing libraries of user-defined routines in a database system, the database system comprising a memory device for storing user-defined routine libraries and a working memory for storing working copies of user-defined routine libraries, the sub-system comprising:

means for defining and launching an unload thread for unloading inactive libraries from the working memory, and means for defining and maintaining an identifying data structure for specifying locations in the working memory, the identifying data structure comprising entries, each entry specifying an associated loaded library stored in the working memory and having an associated last loaded value, the unload thread comprising means for periodically accessing the identifying data structure to identify unload candidate libraries on an unload timing interval, each unload candidate library having an associated entry in the identifying data structure in which the last loaded value indicates that the unload candidate library has been inactive over the preceding unload timing interval;

means for defining and maintaining a timing counter, means for incrementing the timing counter on a periodic basis related to the unload timing interval, and means for defining the last loaded values in entries in the identifying data structure based on the value of the timing counter, and in which the means for periodically accessing the identifying data structure to identify unload candidate libraries comprises means for comparing the last loaded values for entries in the identifying data structure with the timing counter.

19. A method for managing user-defined routine libraries in a database system, the database system comprising a memory device for storing user-defined routine libraries and a working memory for storing working copies of user-defined routine libraries, the database system responding to requests to execute user-defined routines stored in the user-defined routine libraries, the method comprising:

defining and launching an unload thread for unloading inactive libraries from the working memory, and defining and maintaining an identifying data structure for specifying locations in the working memory, the identifying data structure comprising entries, each entry specifying an associated loaded library stored in the working memory and having an associated last loaded value, periodically accessing the identifying data structure to identify unload candidate libraries on an unload timing interval, each unload candidate library having an associated entry in the identifying data structure in which the last loaded value indicates that the unload candidate library has been inactive over the preceding unload timing interval, defining and maintaining a timing counter, defining a last loaded value for the new entry to be the value of the timing counter, when the identified user-defined routine library is loaded in the working memory at the time of the request, updating the last loaded value for the associated entry in the identifying data structure entry to be the value of the timing counter, wherein each unload candidate library has an associated entry in the identifying data structure, and the method includes comparing the last loaded values for entries in the identifying data structure with a timing counter to determine that the unload candidate library has been inactive over the preceding unload timing interval, and incrementing the timing counter on a periodic basis related to the unload timing interval.

20. The method of claim 19, comprising removing libraries from the working memory where such libraries are identified as being unload candidate libraries and where such libraries do not have corresponding list items on the most recently used list.

21. The method of claim 19, wherein the database system is an SQL system.

* * * * *